US008167309B1

(12) United States Patent
Laut

(10) Patent No.: US 8,167,309 B1
(45) Date of Patent: May 1, 2012

(54) SYSTEM AND METHOD FOR PERSONAL WAGERING

(75) Inventor: Steven Laut, Norco, CA (US)

(73) Assignee: Steven Laut, Norco, CA (US)

( * ) Notice: Subject to any disclaimer, the term of this patent is extended or adjusted under 35 U.S.C. 154(b) by 704 days.

(21) Appl. No.: 11/494,179

(22) Filed: Jul. 26, 2006

(51) Int. Cl.
*A63F 13/00* (2006.01)

(52) U.S. Cl. ............................ 273/250; 463/25; 463/42

(58) Field of Classification Search .................... 463/25, 463/42, 26; 705/26; 273/250
See application file for complete search history.

(56) References Cited

U.S. PATENT DOCUMENTS 5,575,474 A 11/1996 Rossides
5,749,785 A 5/1998 Rossides
6,443,841 B1 9/2002 Rossides
2001/0047291 A1* 11/2001 Garahi et al. .................. 705/10
2002/0046137 A1* 4/2002 Odom et al. .................... 705/26
2002/0111815 A1* 8/2002 Smith ............................... 705/1
2003/0018564 A1* 1/2003 Bonnier et al. ................. 705/37
2003/0224854 A1* 12/2003 Joao ................................ 463/40
2004/0192435 A1* 9/2004 Marshall et al. ................ 463/25
2006/0036511 A1* 2/2006 Lin ................................. 705/26

OTHER PUBLICATIONS poserfish.com, POSERFISH.COM S.A.

* cited by examiner

*Primary Examiner* — Peter DungBa Vo
*Assistant Examiner* — Allen Chan
(74) *Attorney, Agent, or Firm* — Steven Laut, Esq.

(57) ABSTRACT

A method and a system to provide a medium for personal wagering for sporting or non-sporting events. Users wager against each other, for any event. Users can make their own odds and handicaps. Users pre-select events and price-range for wagering. Alerts are automatically distributed to users informing them of available wager offers. Funds are received and distributed to the winners.

24 Claims, 7 Drawing Sheets

SYSTEM AND METHOD FOR PERSONAL WAGERING

BACKGROUND OF THE INVENTION

1. Field of the Invention

Exemplary embodiments relate generally to the technical field of personal wagering and, in one exemplary embodiment, to methods and systems to facilitate personal wagers.

2. Description of the Related Art

Online gaming typically consists of online casinos, virtual casinos, horse racing and online sports books. These types of wagering include a house or casino that takes bets from individuals. Therefore, the individuals are betting against the house or casino. The house or casino sets the odds. People that make personal bets with other people in states that do not allow gambling are wagering illegally.

BRIEF DESCRIPTION OF THE DRAWINGS

Embodiments are illustrated by way of example and not by way of limitation in the figures of the accompanying drawings in which like references indicate similar elements. It should be noted that references to "an" embodiment in this disclosure are not necessarily to the same embodiment, and such a reference may mean at least one.

DETAILED DESCRIPTION

A method and system to facilitate personal wagering are described. In the following description, for purposes of explanation, numerous specific details are set forth in order to provide a thorough understanding of an exemplary embodiment of the present invention. It will be evident, however, to one skilled in the art that the present invention may be practiced without these specific details.

Exemplary Platform Architecture

Figure 1:
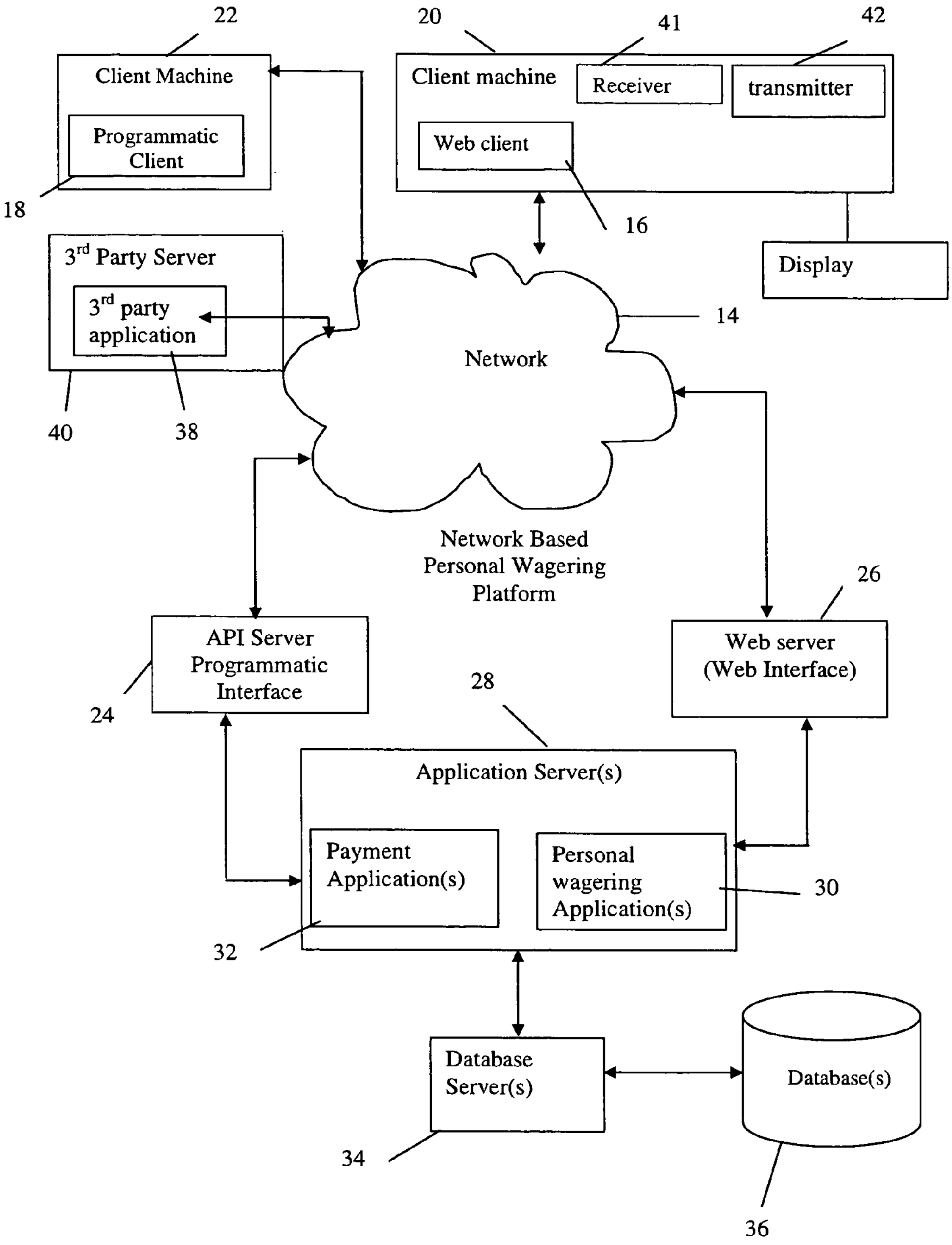
FIG. 1 is a block diagram of an exemplary web-based facility in the form of a network based personal wagering facility according to one embodiment of the present invention.

FIG. 1 is a network diagram depicting a system 10, according to one exemplary embodiment, having a client-server architecture. A personal wagering platform, in the exemplary form of a network based personal wagering facility 12, provides server-side functionality, via a network 14 (e.g., the Internet) to one or more client machines 20 and 22. FIG. 1 illustrates, for example, a web client 16 (e.g., a browser, such as the INTERNET EXPLORER browser developed by Microsoft Corporation of Redmond, Wash. State), and a programmatic client 18 executing on respective client machines 20 and 22.

Turning specifically to the network based wagering facility 12, an Application Program Interface (API) server 24 and a web server 26 are coupled to, and provide programmatic and web interfaces respectively to, one or more application servers 28. The application servers 28 host one or more personal wagering applications 30 and payment applications 32. The application servers 28 are, in turn, shown to be coupled to one or more database servers 34 that facilitate access to one or more databases 36.

The personal wagering applications 30 provide a number of personal wagering functions and services to users that access the personal wagering facility 12. The payment applications 32 likewise provide a number of payment services and functions to users. The payment applications 30 may allow users to quantify for, and accumulate, value (e.g., in a commercial currency, such as the U.S. dollar, or a proprietary currency, such as "points") in accounts, and then later to use the accumulated value for wagering that are made available via the personal wagering applications 30. While the personal wagering and payment applications 30 and 32 are shown in FIG. 1 to both form part of the network based personal wagering facility 12, it will be appreciated that, in alternative embodiments, the payment applications 32 may form part of a payment service that is separate and distinct from the personal wagering facility 12.

Further, while the exemplary system 10 shown in FIG. 1 employs a client-server architecture, the present invention is of course not limited to such an architecture, and could equally well find application in a distributed, or peer-to-peer, architecture system. The various personal wagering and payment applications 30 and 32 could also be implemented as standalone software programs, which do not necessarily have networking capabilities.

The web client 16, it will be appreciated, may access the various personal wagering and payment applications 30 and 32 via the web interface supported by the web server 26. Similarly, the programmatic client 18 may access the various services and functions provided by the personal wagering and payment applications 30 and 32 via the programmatic interface provided by the API server 24. The programmatic client 18 may, for example, be a betting application to enable wagerers to author and manage wager offers/acceptance on the personal wagering facility 12 in an off-line manner, and to perform batch-mode communications between the programmatic client 18 and the network based personal wagering facility 12.

FIG. 1 also illustrates a third party application 38, executing on a third party server machine 40, as having programmatic access to the network based personal wagering facility 12 via the programmatic interface provided by the API server 24. For example, the third party application 38 may, utilizing information retrieved from the network based personal wagering facility 12, support one or more features or functions on a website hosted by the third party. The third party website may, for example, provide one or more promotional, personal wagering or payment functions that are supported by the relevant applications of the network based personal wagering facility 12.

In one embodiment, client machine 20 also includes a receiver 41, transmitter 42 and a display 45. In one embodiment receiver 41 wirelessly receives data/information and transmitter 42 transmits data/information wirelessly. In one embodiment, client machine 20 is mobile, such as disposed in a vehicle, a notebook computer, a personal digital assistant (PDA), a cellular telephone, etc. Receiver 41 may be capable of receiving information/data/voice/video content, for example from network 14. Transmitter 42 may be capable of transmitting information/data/voice/video content to, for example network 14. The display 45 can be any type of display capable, for example, of displaying graphical/video/images/text. A user interface may also be coupled to client machine 20. The user interface may be a keyboard, resistive digitizer (e.g., touchscreen), mouse, microphone/speaker(s), etc. Transmitter 42 may transmit location information/data in a hypertext (HTTP) transmission.

Personal Wagering Applications

Figure 2:
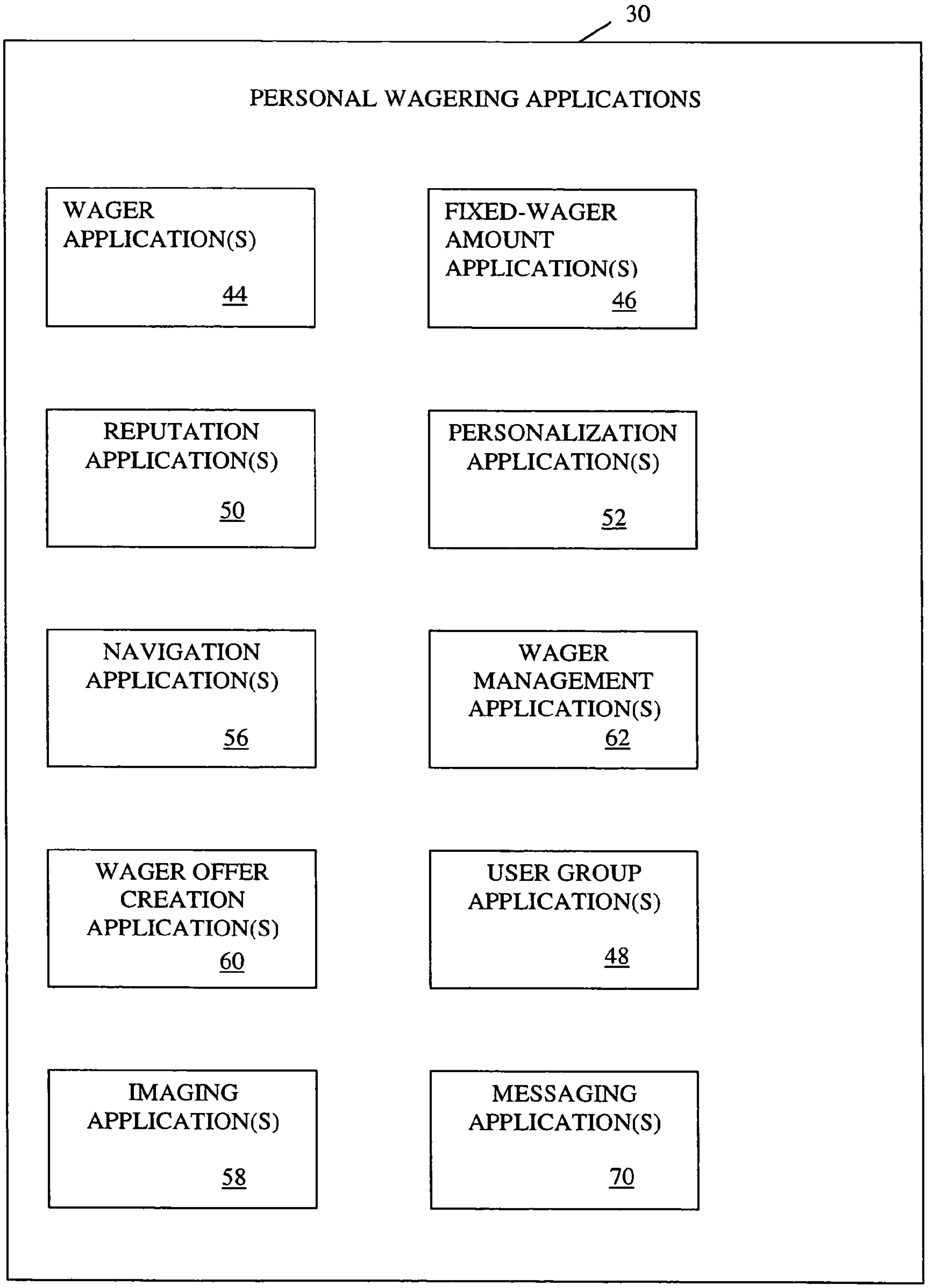
FIG. 2 is a database diagram illustrating an exemplary database, maintained by and accessed via a database engine server, that at least partially implements and supports a SPAM inhibiting tool in the personal wagering facility according to one embodiment of the present invention.

FIG. 2 is a block diagram illustrating multiple personal wagering and payment applications 30 that, in one exemplary embodiment of the present invention, are provided as part of the network based personal wagering facility 12. The network based personal wagering facility 12 may provide a number of personal wagering offers whereby a user may provide listings (e.g., list wager offers) a user can express interest in or indicate a desire to wager, and a wager amount or item can be set for a bet pertaining to the offered wager. To this end, the personal wagering applications 30 are shown to include one or more wager applications 44 which support wager-format listing and wager amount setting mechanisms. The various wager applications 44 may also provide a number of features in support of such wager-format listings, such as a minimum wager amount, maximum wager amount, maximum loss for a specified period (e.g., weekly, monthly, etc.) and maximum total wagers whereby a user may specify a wager amount in connection with a listing and a proxy-wagering feature whereby a user may invoke automated proxy wagering.

A number of fixed-wager amount applications 46 may support fixed-wager amount listing formats. For example, a user may have a set wager amount (e.g., $5.00, $10.00, $20.00, $100.00, etc.) to offer in conjunction with a specific type of event, such as a specific baseball team game, basketball team game, football team game, rugby, tennis match, jai lai, cricket, polo, wrestling, boxer, chess match, election, etc. In another embodiment, non-fixed (i.e., user specified) wager amounts can be specified by a user as desired.

User group applications 48 may allow specific users to group their listings within a "virtual" wagering facility, which may be personalized by and for the specific users. In this embodiment, users join a group by either being invited or requesting to join. The users in a group can then wager with one another. The groups may be public or non-public. A public group allows non-group users to see the wagering statistics of the individuals and group. A non-public group only allows group members to view individual members or group statistics.

Reputation applications 50 may allow users that wager utilizing the network based personal wagering facility 12 to establish, build and maintain reputations, which may be made available and published to potential users. Consider that where, for example, the network based personal wagering facility 12 supports person-to-person wagering, users may have no history or other reference information whereby the trustworthiness and credibility of potential wagering partners may be assessed. The reputation applications 50 may allow a user, for example through feedback provided by other wager partners, to establish a reputation within the network based personal wager facility 12 over time. Other potential wagering partners may then reference such a reputation for the purposes of assessing credibility and trustworthiness. Personalization applications 52 may allow users of the network based personal wagering facility 12 to personalize various aspects of their interactions with the personal wagering facility 12. For example a user may, utilizing an appropriate personalization application 52, create a personalized reference page at which information regarding wagers to which the user is (or has been) a party may be viewed. Further, a personalization application 52 may enable a user to personalize wager offers and other aspects of their interactions with the personal wagering facility 12 and other parties.

In one embodiment, the network based personal wagering facility 12 may support a number of wager offers from users that are customized for specific geographic regions, or specific demographics. A version of the network based personal wagering facility 12 may be customized for the United Kingdom, whereas another version of the marketplace 12 may be customized for the United States. Each of these versions may operate as an independent personal wagering facility, or may be customized (or internationalized) presentations of a common underlying personal wagering facility.

Navigation of the network based personal wagering facility 12 may be facilitated by one or more navigation applications 56. For example, a search application may enable key word searches of wager offers published via the personal wagering facility 12. A browse application may allow users to browse various category, catalogue, or type of event data structures according to which wager offers may be classified within the personal wagering facility 12. Various other navigation applications may be provided to supplement the search and browsing applications.

In order to make wager offers, available via the network based personal wagering facility 12, as visually informing and attractive as possible, the personal wagering applications 30 may include one or more imaging applications 58 which users may utilize to upload images for inclusion within wager offers. An imaging application 58 may also operate to incorporate images within viewed wager offers. The imaging applications 58 may also support one or more promotional features, such as image galleries that are presented to potential wagerers.

Wager offer creation applications 60 may allow wager offerers conveniently to author listings pertaining to types of events that they wish to wager via the personal wagering facility 12, and wager management applications 62 may allow wager offerers to manage such wager offers. For example, where a particular wager offerer has authored and/or published a large number of wager offers, the management of such wager offers may present a challenge. The wager offer management applications 62 may provide a number of features (e.g., auto-relisting) to assist the wager offerer in managing such listings. One or more post-listing management applications 64 may also assist wager offerers with a number of activities that typically occur post-listing. For example, upon completion of a wager facilitated by one or more wager applications 44, a user may wish to leave feedback regarding a particular user. To this end, a post-listing management application 64 may provide an interface to one or more reputation applications 50, so as to allow the user conveniently to provide feedback regarding multiple users to the reputation applications 50.

Messaging applications 70 may be responsible for the generation and delivery of messages to users of the network based personal wagering facility 12, such messages (e.g., web posting or email) for example advising users of wager offers for specific events (e.g., sporting events, or other non-sporting events, such as elections, etc.) that may be of interest to certain users. In one embodiment, users obtain an account and select specific teams, players, participants, etc. that they are interested in wagering on. For example, a user may be a fan of a college or professional athletic team, a boxer, a person running for office, etc. When a user selects to place a personal wager offer, all users that selected an opposing participant in the event is automatically alerted to the offer. In one embodiment, a user can select a specific location to limit wager offers to users located in the specific locations. The specific locations may be a city, a state, a country, a continent, etc.

Data Structures

Figure 3:
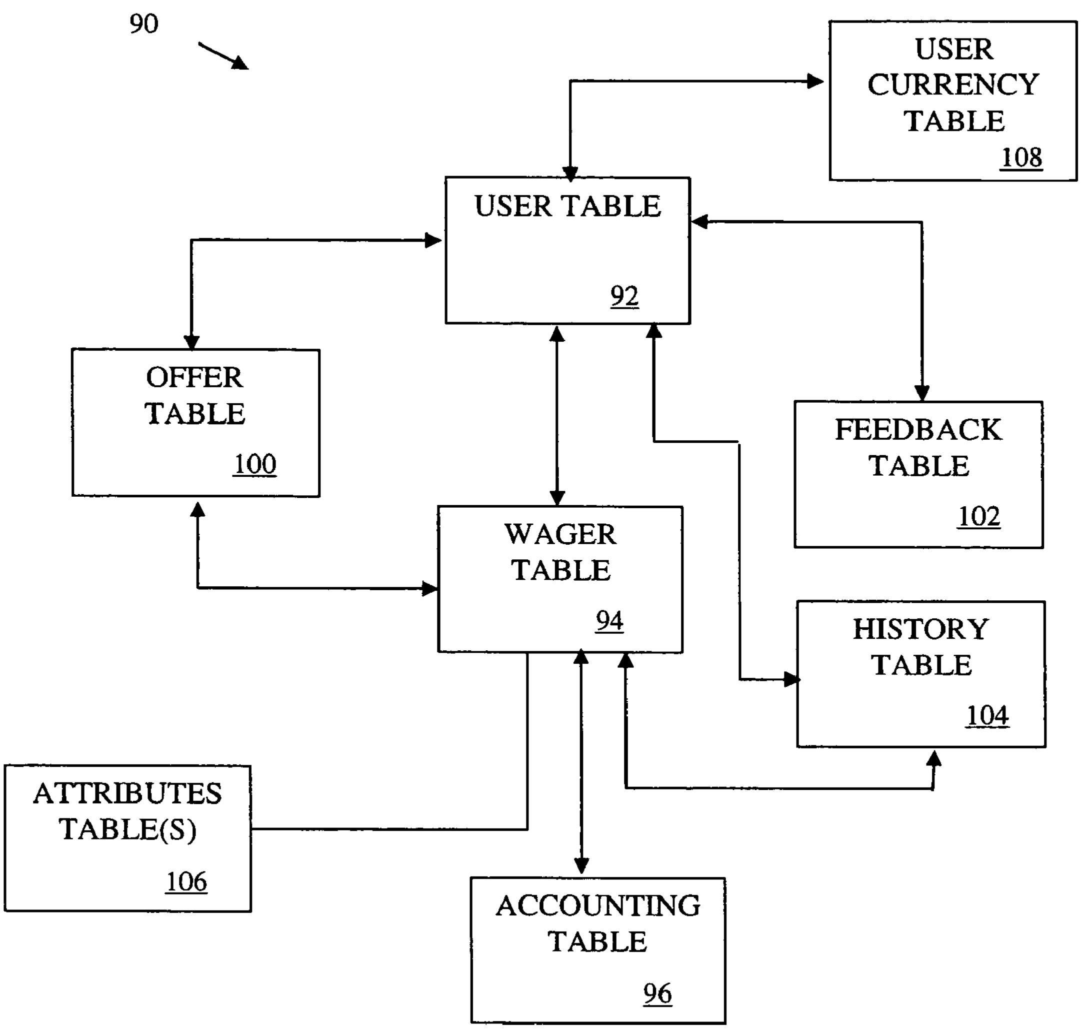
FIG. 3 provides exemplary detail of the user table shown in FIG. 2.

FIG. 3 is a high-level entity-relationship diagram, illustrating various tables 90 that may be maintained within the databases 36, and that are utilized by and support the personal wagering facility and payment applications 30 and 32. A user table 92 contains a record for each registered user of the network based personal wagering facility 12, and may include identifier, address and financial instrument information pertaining to each such registered user. A user may, it will be appreciated, operate as an offerer, an acceptor, or both, within the network based personal wagering facility 12.

The tables 90 also include, for example, a wager table 94 in which is maintained item records for wagers that are available to be, or have been, completed via the personal wagering facility 12. Each item record within the items table 94 may furthermore be linked to one or more user records within the user table 92, so as to associate an offerer and one or more actual or potential acceptors with each item record.

An accounting table 96 may have records for all wagers pertaining to users for which records exist within wager table 94. The accounting table tracks wins/losses continuously. In one embodiment, the high winners/losers are posted for a predetermined period (e.g., daily, weekly, monthly, yearly, etc.). Big wins/losses are also posted for a predetermined period.

Offer records within an offer table 100 may each relate to an offer announced on the network based personal wagering facility 12 in connection with a wager-format listing supported by a wager application 44. A feedback table 102 may be utilized by one or more reputation applications 50, in one exemplary embodiment, to construct and maintain reputation information concerning users. A history table 104 may maintain a history of wagers to which a user has been a party. One or more attributes tables 106 may record attribute information pertaining to wagers for which records exist within the wager table 94. Considering only a single example of such an attribute, the attributes tables 106 may indicate a currency attribute associated with a particular wager, the currency attribute identifying the currency of a wager amount for the relevant wager as specified by an offerer. Other attributes, such as odds given, point spread, etc. may also be included.

In another embodiment, user currency table 108 may include geographical based currency and currency conversion (to compare home-based currency with mobile-based currency if out of the home country). In this embodiment, when a user leaves their respective home country, if the new country has a different currency, a conversion of the home-based currency to the new country currency may be made and returned to the user to ease wagers.

Figure 4:
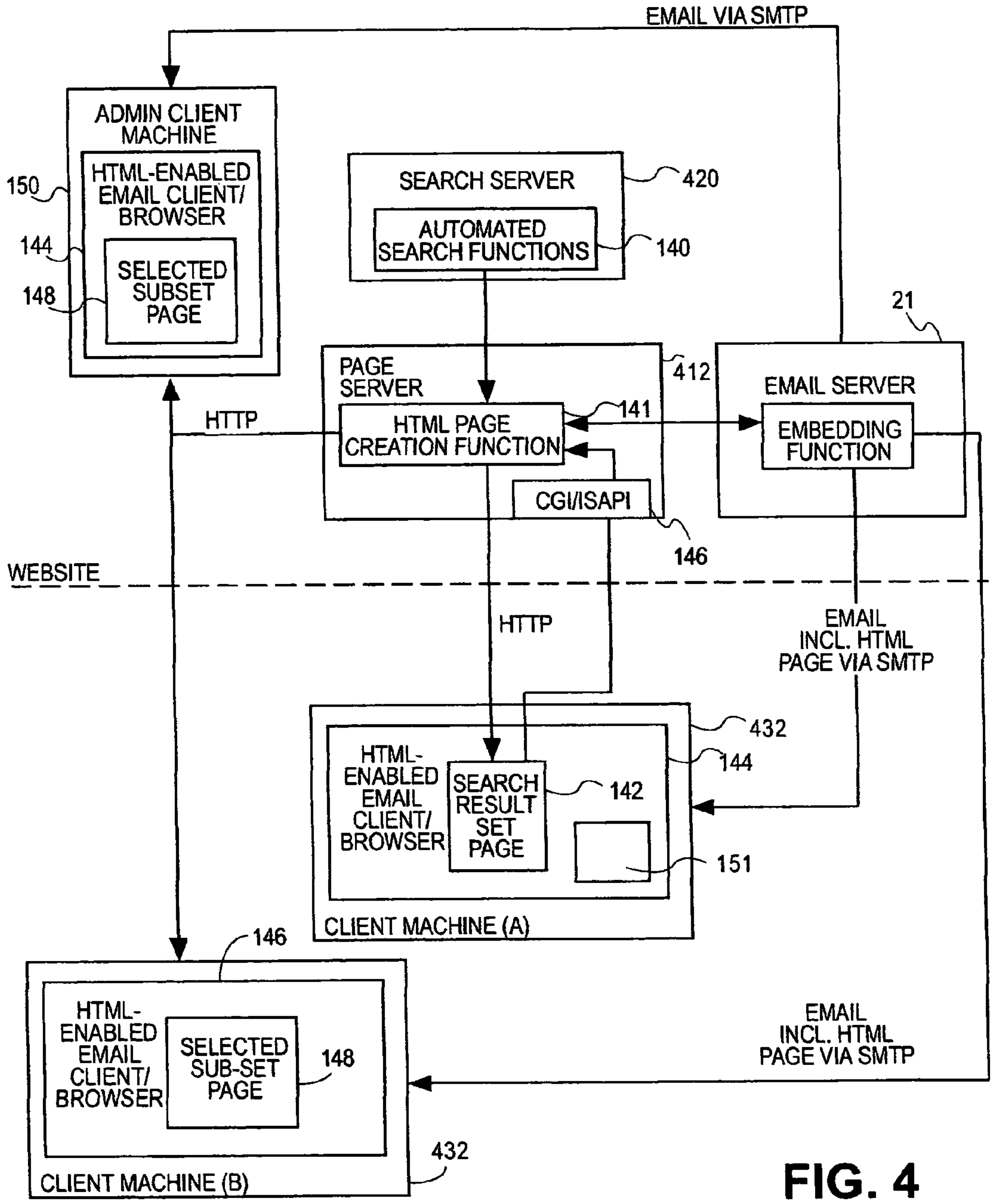
FIG. 4 is a block diagram illustrating an exemplary environment within which email alerts to users may be made when an event is available for wagering.

FIG. 4 illustrates a specific exemplary environment within which email alerts to users may be made when a user makes an offer of wager for a specific event. In one exemplary embodiment, an automatic telephone recording or text message is sent to users instead of an email alert. The alerts may allow a user to be aware that a respective user is making an offer for wager within a wager range and for a specific event and allows the offerer to inform the users of particular wagers offered.

System 10 may provide an automated "watching" service to users, whereby an automated search is periodically conducted to locate wager offers that are posted to a website as well as being emailed or instead of being emailed, as identified utilizing specified search criteria.

In FIG. 4, search server 420 of system 10 is shown, by way of example, to perform a number of automated search functions 140 to provide the above-discussed automated "watching" services and to generate a result set of offers according to a specified search criteria. The result set may be communicated from the search server 420 to a page server 412 that generates a markup language document (e.g., an HTML page), for example, by populating a template with the result set to thereby generate a search result set page 142. The search result set page 142 may, for example, be an HTML document, or may be a text-based e-mail message that includes a network location identifier (e.g., URL) that identifies an HTML document embodying the search results. In FIG. 4, the search result set page 142 is shown to be communicated to an HTML-enabled e-mail client or browser 144 that executes in a client machine 432.

The search result set page 142 may include number of check boxes adjacent to each of the data items identifying the search result set. By checking the check boxes, the user is able to identify a subset of the search result set and to communicate the selected subset back to the page server 412 by selection of "submit" button presented within the search result set page 142. For example, the subset may be communicated as an e-mail message or an HTTP PUT request, or utilizing any other transfer protocol or communication. The page server 412 may execute a CGI script, or an ISAPI script, 146 that receives the communication of the subset of the search results, parses the communication to locate item identifiers (e.g., numeric or otherwise) embodied within the communication and communicates these identifiers to a page creation function 141. The page creation function 141 may then compose a new markup language document embodying the subset of the search result set.

The markup language document embodying the subset of search results may, for example, be communicated to a further user in one of two ways. In one embodiment, the page creation function 141 may communicate a URL identifying the created page to any email server 21, which may compose a text-based email message that is then communicated from the email server 21 to a client machine 432 of a targeted user. In this case, utilizing the URL embedded in the email message, the user of the client machine 432 may access the created markup language document utilizing a browser application.

In an alternative embodiment, the page creation function 141 may communicate a markup language document to the email server 21, which may embed the markup language document in an email message. The email message may then be communicated to an HTML-enabled client 144 executing on the client machine 432, which the user of the client machine 432 may utilize to view the markup language document. An example of this markup language document is indicated in FIG. 4 as being the selected subset page 148.

In FIG. 4, client machines 432 are shown to reside outside the context of a web site. Accordingly this embodiment describes an application which allows a first user of a client machine 432 (e.g., client machine (A)) to communicate a subset of search results to a user of a further client machine 432 (e.g., client machine (B)), both of which reside outside a web site or network based wagering facility.

An alternative application may allow the user of a client machine 432 to communicate the select subset search results of the search results to an administrator of a wager facility (or web site) that utilizes an administrator client machine 150.

Figure 5:
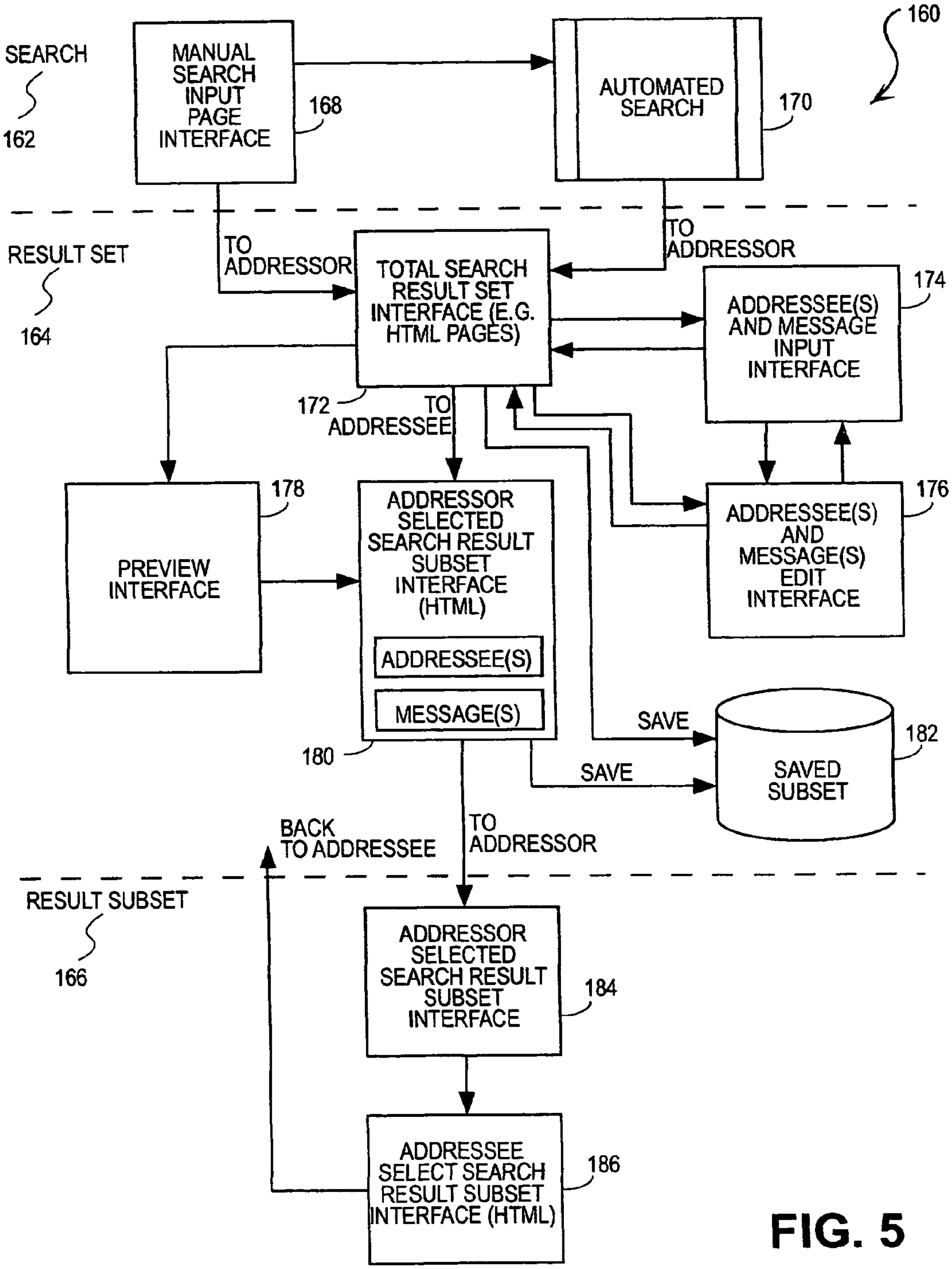
FIG. 5 is an interface map illustrating a collection of interfaces, according to an exemplary embodiment of the present invention, to facilitate communication between users.

FIG. 5 is an interface map 160, according to an exemplary embodiment, illustrating a collection of interfaces that may be presented to entities (e.g., users or administrators) to facilitate the communication of search results between such entities. The interfaces are furthermore categorized, for example, as comprising search interfaces 162, result set interfaces 164 and result subset interfaces 166.

A first user may be presented with manual search input page interface 168 that facilitates the input and specification of search criteria. The input into interface 168 may, in one embodiment, be stored as an automated search 170.

Regardless of whether a search is conducted as a result of a specific (e.g., unique) search request inputted into interface 168, or as automated search 170, a search result set may be presented in a result set interface 172. In one embodiment, the result set interface 172 comprises a markup language document in the form of an HTML page that lists a descriptor for each of the search results. Each descriptor may comprise hypertext linked to a document.

Each descriptor may furthermore be displayed adjacent a check box, which is user-selectable to mark a data item to be included within a subset of the search results to be communicated to a further entity. The interface 172 may further present a "submit" or "send" button that is user-selectable to communicate the select subset, together with a default message, to a default addressee.

An addressee and message selection input interface 174 may also be accessible from the result set interface 172. Utilizing the interface 174, an addressor entity may chose from a number of pre-defined messages to accompany the subset of the result set, and also specify one or more addressees.

An addressee and message edit interface 176 may also be accessible from the result set interface 172 and/or the input interface 174. Utilizing the interface 176, an addressor user may edit a list of potential addressees, and also edit or author messages presented for selection in the input interface 174.

A preview interface 178 may be accessible from the result set interface 172, and allow an addressor to preview the subset and messages to be communicated to the addressee. For example, the preview interface 178 may present the HTML page that includes hypertext descriptors of the data items of the search result subset.

A subset interface 180 may then be presented to the addressor for review. The subset interface 180 may include hypertext descriptors of the data items of the search result subset and may also include a listing of one or more addressees and a message to accompany the result subset (e.g., the default or user-specified message).

The selected search result may also be saved as a saved subset 182 from either the search result set interface 172 or by performing an appropriate user-selection within the subset interface 180.

The search result subset, as described within the exemplary context of an HTML document, may then be communicated to the addressee as a result subset interface 180 that may be viewable by the addressee (e.g., user). The result subset interface 180, as described by way of example above, may include descriptors for each of the data items of the subset, each descriptor may comprise hypertext. Accordingly, user selection of the hypertext may conveniently cause a retrieval of a full document included in the result subset. Further, each of the descriptors presented within the result subset interface 180 may also be presented in association with a check box to facilitate addressee or user selection from within the subset. Utilizing the check boxes, this addressee may then define a narrowed subset of the search result set, and utilizing interfaces similar to those described above, communicate a narrowed subset back to the original addressor, or to further addressees. This narrowed subset of the search results may again be listed within the context of a subset interface 186 and may include a message appropriate to the narrowed subset.

Figure 6:
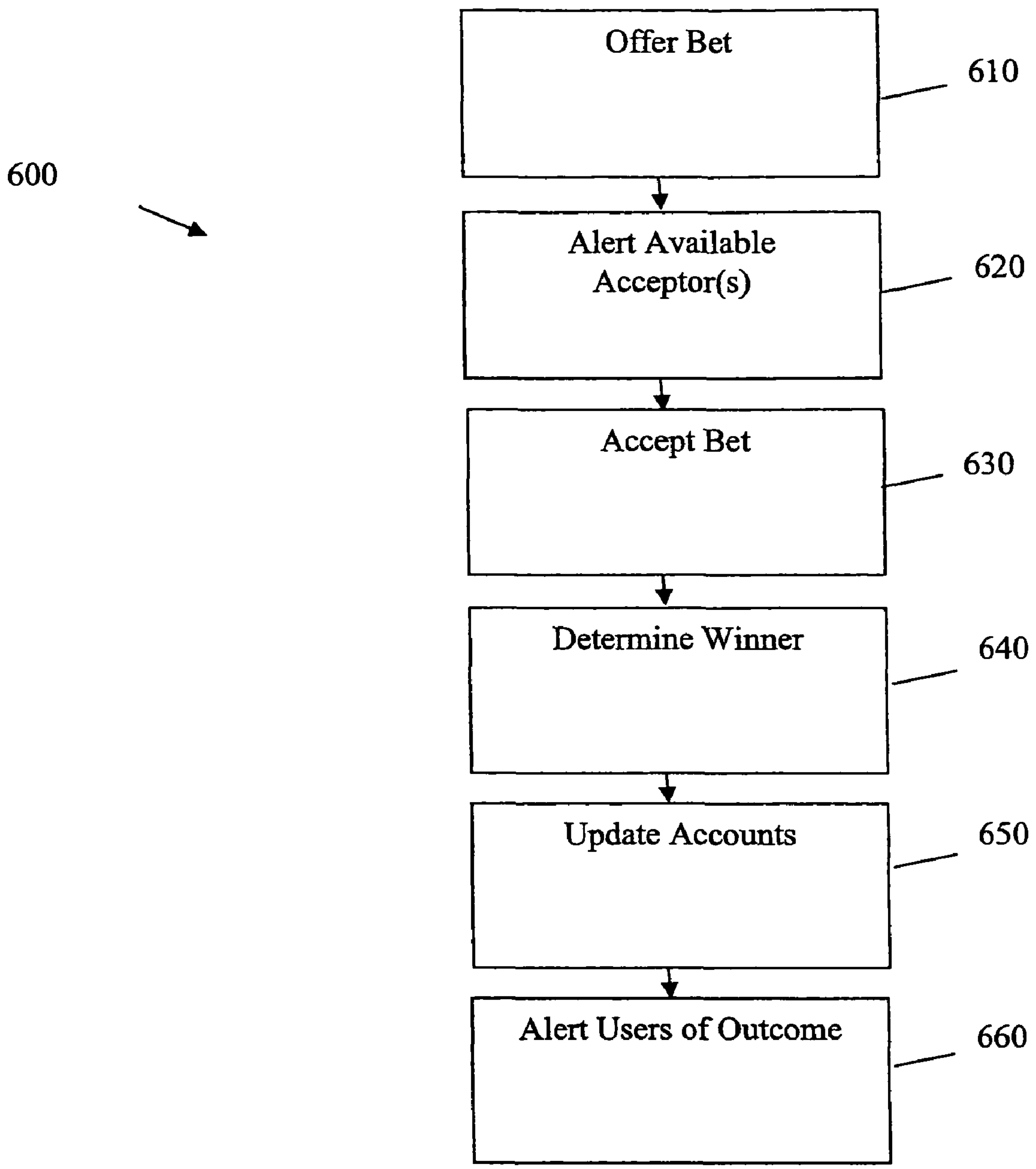
FIG. 6 illustrates a block diagram of an exemplary process for facilitating personal wagering.

FIG. 6 illustrates an exemplary block diagram of a process or method of an embodiment. In one embodiment a website is set up where any user can bet against any other user, any chosen amount, on anything. The bets may be for certain sporting events/games, matches or races. There may be bets made on elections, etc. In process 600, in block 610 a first person makes a bet offer (e.g., a first person makes a bet offer of $10.00 that the Mavericks will get beaten by the Miami Heat in game 2 of the 2006 NBA championship series). An email or other alert is sent out alerting available acceptors of the bet. The available acceptors are determined by user preferences, which include teams, individuals, events, etc. that the user finds acceptable to wager on.

In one embodiment the user preferences are continuously updated for new events. In this embodiment, the website continuously lists new events under categories (e.g., worldwide: baseball, basketball, hockey, soccer, boxing, car races, horse races, etc. In one embodiment, a user can specify the country to find events. When the events are listed, a user can choose to add an event to their preference list by selecting the event (e.g., a checkbox, clicking on the event, etc.).

In block 620, a user accepts the offered bet. The first person to accept the bet closes the bet, unless the first person is allowing a certain number of bets (e.g., 2 bets, 5 bets, etc. for a set amount each). The first person transfers the amount of the offered bet into an account (e.g., an escrow account, neutral account operated by website, etc.). The person taking the bet transfers the amount of the bet as well. In one embodiment, if the user has the amount of the bet in their account, the funds are automatically transferred to a neutral account. After the results are in, the money is transferred to the winner minus a service fee (e.g., 10% total wager, set fee of $0.50, $1.00, etc.). The first person may also set handicap (e.g., in a baseball game, 1 run; in a football game, 7 points, 10,000 votes in an election, etc.). The originating bettor (i.e., offerer) can also place odds (e.g., 2-1, 3-1, etc.). The website may have links to websites with odds, etc. (e.g., sport books, newspaper sport sections, casinos, etc.) so users can check current odds, handicaps, etc.

Multiple bets are handled similarly. Also, users can set up lists of people they like to bet with. Therefore, users can set up a list/group of friends that can bet each other. The users can close the lists as well so only the users in the list can bet with each other.

Advertisements of events can be placed on the website to raise revenue for the website (e.g., a big boxing match, horse race, car race, etc.). Displays of total bets on events can be selected for display for each user. Users can set limits of wagers. For example, a user may limit their monthly betting amount or set the amount of losses to a maximum value amount.

In block 640, a winner is determined. Alerts (e.g., e-mails, text messages, etc.) are sent announcing receipt of funds, and transfer of win/loss amounts. Announcements of events are also sent out as reminders. Users that set up friend lists/groups can have automatic emails sent to others on the list when they offer to make a wager. Wagers can be "upped." For example, an originator of a bet can bet $10 on a baseball game. The taker of the bet can accept and offer or "up" the wager to $20. The originating better can take the "upped" wager or decline.

The network based wagering facility receives all bets and determines winners and losers. In a tie, the bettors get their wager funds returned minus the service fee. It should be noted that other embodiments do not charge a service fee. Still other embodiments may only charge a registration fee (e.g., yearly fee, monthly fee, one-time only fee, etc.) The networked based wagering facility can be set up wherever gambling is legal. That is, the hardware and software running on the hardware are located in a location where gambling is legal. For example, states that allow wagering (e.g., Nevada), Australia, offshore facilities, etc.

In block 650, accounts of the users are updated. That is, funds are transferred from a neutral account to the winner's account. Win/loss statistics are updated for each user. The amounts of win/loss is updated for each user and displayed or made available for display by the user's selection. In block 660, alerts are transmitted to the users informing them of the outcome of the event.

Horse racing is usually bet in a paramutual way. However, in one embodiment, through the website people can bet whether a horse wins or not, or places, shows, etc. Olympic games and world cup soccer games may be wagered on. In one embodiment, users may wager on multiple events where the total outcome of the events determines a winner. For example, a user may bet on all/part of college football games on a specific date. The user with the most picked winners is declared the winner. Users may make seasonal pools for events throughout s specific season (e.g., college football season, basketball seasons, etc.).

User's total wins/losses are kept in account managing files or in a database. This way a user can report wins and losses for tax purposes; can use the records for personal finances, etc.

In one embodiment, a hyperlink to a finance company can allow qualified users to obtain funds for betting. Once a user is funded, the funded amount is transferred to the user's account. When the user makes a bet, the necessary funds are transferred to the neutral account.

In one embodiment companies/corporations/businesses/etc. can have a company account where participating people (e.g., employees) can pool funds. In this embodiment, companies/corporations/etc. can bet against one another. The company account can also be used for company wagering pools. The account can be used for charitable donations as well.

In one embodiment users can wager for goods or services. Items, such as dinners/lunches/products/massages/memberships/sporting tickets/house cleaning/, cars, etc. can be wagered by purchasing gift certificates from participating restaurants/stores/clubs/dealerships, etc. or purchasing the items from participant vendors. For example, if a $25 gift certificate is purchased, $25 plus the service fee is transferred from the user's account. Upon a user winning, the gift certificate is either mailed or emailed to the winner. In one embodiment, a wager offer is made for the goods or services. Each user (offerer/accepter) transfers funds to the neutral account. When the winner is determined, the funds are transferred to the vender. The vender then sends out a gift certificate (email or mail), or ships the goods or proof of purchase for services to be rendered.

Users must have valid bank accounts or check cards. Funds must be verified in advance of a wager. When users set limits on losses on a weekly or monthly basis, once the limit is reached, no other bets can be made until the following month, week, etc. Users that want to up their limit may override the limit for an event.

Users can send thank you emails, or "rub it in" emails by selecting a type of email from the website. Users can select to leave funds in their account, transfer to a bank account or receive a check for the amount of funds in their account.

In one embodiment, users can offer/accept bets from cellular telephones through a downloaded program, such as a java program. This allows users to check accounts, transfer funds, check status of bets, etc.

In one embodiment, users can select to donate any portion of their winning amount to various charities. This can be set up on a constant basis or individual donation basis. The choices of charities are given to the users on a web page or through hyperlinks in emails. Users can also select desired charities to donate to through a cell phone or other wireless device.

In one embodiment, the determination of winning can be made by a third party. Once the determination of a winner of an event is made, a database is updated to include winners and losers. All bets are entered into another database. A program reads the bets and sets a flag for the winners. A program reads the database, the winner, loser, bet amount and event and enters the information in an alert to the users (e.g., email). The accounts are updated as well with the winning amount.

In one embodiment, betting "pools" can be formed for events, such as the Super bowl, college bowl games, college football games, NFL games, baseball games, etc. Different types of pools may be set up. There can be winner take all, half-time and end of game, and quarter by quarter (i.e., for football games). The pools can be started by any user. The user can set the wager, e.g., $1, $2, $5, $10, $100, $1000, etc. per square (e.g., 100 squares representing 0-9 digits across (first team) and up/down (second team)). One embodiment has the users pick a square that is available. The other embodiment randomly selects an available square and assigns that square to a user. When all 100 squares are filled the pool is closed. The originating user can determine if there are limits on squares per wagerer. For example, the originating user can select two square max., three square max., no max, etc. If there are available squares a certain preset time before the event (e.g., one day, five hours, two hours, etc.), emails are sent out to entrants informing them of available squares. The entrants can then purchase available squares or decline the offer. If there are available squares by the event time, the available squares become tie squares. In the case of a tie, the users get their money back minus a small service fee (e.g., 5%, 7%, 10%, $0.50, $1.00, etc.). In other embodiments, no service fee is charged. When the event is over, the winning square holders receive winnings minus a service fee. The winners will have their square(s) match the end digit of a sporting event (e.g., for a football score of 24-7, the winning square is 4 and 7 for the winning team.

In another embodiment, users can set up their own personal pages listing their favorite teams, sports, events, etc. that they like to wager on. On the personal pages, the users can have photos uploaded, describe themselves, receive messages from other users, etc. The personal pages may be open to all users or closed to specified users. The personal pages may list bets outstanding, wager history, etc.

In one embodiment, users can "call out" either specified users or unspecified users to make a bet with them. In the "call out," an email is sent with enticing language (e.g., bet me if you dare!, if you're not chicken . . . , etc.).

In one embodiment, other gaming sites can join in and offer bets to any specified amount of users. For example, another online sports book, casino or website housing a casino or sports book may want to bet $20 multiple times (e.g., 50 times, 100 times, etc.) for a certain event, with specified odds. These other online betting websites must become an entrant just like an ordinary user. For the other online betting websites, a message on a homepage of the website may specify the grounds for the bet and any other advertising (for which they may be charged a fee).

The embodiments provide for a community of personal wagerers and a vehicle for personal betting. This works well especially for friends or relatives that are distant from one another. Also, since the personal wagering is worldwide, people from different countries may wager for their team or individuals in worldwide events against other wagerers from an opposing country (e.g., in an Olympic event, world cup soccer, etc.).

Figure 7:
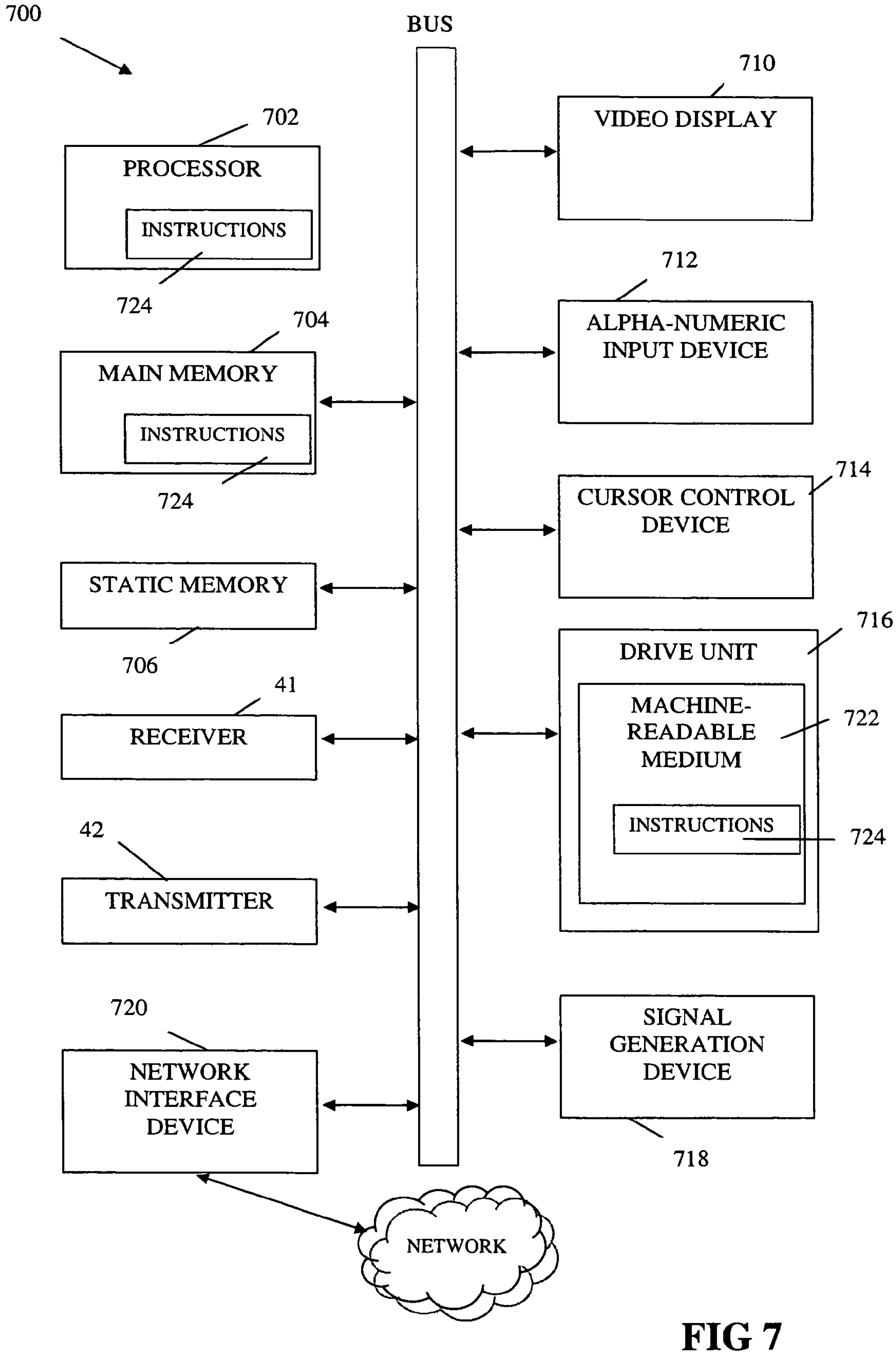
FIG. 7 illustrates a diagrammatic representation of machine in the exemplary form of a computer system.

FIG. 7 shows a diagrammatic representation of a machine in the exemplary form of a computer system 700 within which a set of instructions, for causing the machine to perform any one or more of the methodologies discussed herein, may be executed. In various embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a PC, a tablet PC, a set-top box (SIB), a PDA, a cellular (or mobile) telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a cursor control device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions (e.g., software 724) embodying any one or more of the methodologies or functions described herein. The software 724 may also reside, completely or at least partially, within the main memory 704 and/or within the processor 702 during execution thereof by the computer system 700, the main memory 704 and the processor 702 also constituting machine-readable media.

The software 724 may further be transmitted or received over a network 726 via the network interface device 720. In one embodiment, receiver 41 and transmitter 42 (see FIG. 1) are coupled to bus 708.

While the machine-readable medium 726 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present invention. The machine-readable medium includes any mechanism that provides (i.e., stores and/or transmits) information in a form readable by a machine (e.g., a computer, PDA, cellular telephone, etc.). For example, a machine-readable medium includes read-only memory (ROM); random-access memory (RAM); magnetic disk storage media; optical storage media; flash memory devices; biological electrical, mechanical systems; electrical, optical, acoustical or other form of propagated signals (e.g., carrier waves, infrared signals, digital signals, etc.). The device or machine-readable medium may include a micro-electromechanical system (MEMS), nanotechnology devices, organic, holographic, solid-state memory device and/or a rotating magnetic or optical disk. The device or machine-readable medium may be distributed when partitions of instructions have been separated into different machines, such as across an interconnection of computers or as different virtual machines.

By using the website that is run on a server in a location that provides legalized gambling, users avoid the problem of gambling illegally by personally betting against another user. Friends that have moved apart can still get together and make personal bets for events. The embodiments provide a legal way for office event pools to be formed in states where gambling is not legal. The ease of setting up an office pool takes the burden out of collecting wager funds, disbursing the funds to the winner(s), etc. And, once a pool has the maximum number of participants (e.g., 100), new pools can be started. Portable devices may be used to check on wagers, check wager statistics, make wager offers, accept wager offers, and select event preferences and wager price ranges. This makes it convenient for users that want to wager but do not have access to a computer.

Thus, a method and system provide network based personal betting have been described. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Accordingly, the specification and drawings are to be regarded in an illustrative rather than a restrictive sense.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances "an embodiment," "one embodiment," or "some embodiments" are not necessarily all referring to the same embodiments. If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

What is claimed is:

1. A system comprising:

a plurality of servers coupled to a wide-area network having a plurality of wager content stored in at least one memory device;

a plurality of users that communicate with the wide-area network over a communications medium, the plurality of users having varying event preferences;

the plurality of users each having a hyperlink browser to send HTTP requests to the plurality of servers and to render wager content returned in response to the HTTP requests;

wherein the plurality of servers automatically alert said plurality of users of selected wager content in response to the HTTP requests, wherein said plurality of users are automatically alerted based on:

a first user of the plurality of users selecting a wager on an event for a first outcome between a first opponent and a second opponent, wherein at least the first outcome and a second outcome are possible outcomes for the event and wherein the first outcome and the second outcome are different outcomes;

a second user of the plurality of users having previously selected second opponent preferences, wherein said plurality of servers determines that the second opponent is in the event with the first opponent selected by the first user;

and automatically alerting the second user to accept the wager for the second outcome, based on the first user selecting the wager for the first outcome, and wherein the alerting is further based on preselected event type of the second user.

2. The system of claim 1, wherein the second user pre-selects a price range for offered wagers, and the automatically returned wager content is within the pre-selected price range, and an event type comprises sporting team games or matches, sporting individual one-on-one events, elections and non-parimutuel events.

3. The system of claim 2, wherein the user with certain preselected event preferences is automatically alerted when a wager if offered within the pre-selected price range and for the certain preselected event preferences via one or more of: text messaging and email messaging.

4. The system of claim 1, wherein the second opponent comprises a user preselected team, athlete or individual.

5. The system of claim 1, wherein the second user is automatically alerted to wager content without user interaction based on favorite sporting teams and sporting individuals that are preselected by the second user.

6. The system of claim 1, wherein the hyperlink browser runs on one of a cellular telephone, a personal digital assistant (PDA), a personal computer (PC), a palm computer, and a notebook computer.

7. The system of claim 1, wherein at least a portion of winning funds can be automatically transferred to participating charities preselected by a user, wherein the participating charities are shown to users through hyperlinks in email, or selected through a wireless device.

8. The system of claim 1, wherein a group of users wager against other groups of users for an event in a wager pool for a group selected specific event.

9. A method comprising:

employing a processor to execute the steps of:

a first user using a website to select a wager offer for a first outcome for an event, wherein the event is between a first opponent and a second opponent, wherein at least the first outcome and a second outcome are possible outcomes for the event, and wherein the first outcome and the second outcome are different outcomes;

a second user having previously selected second opponent preferences, wherein a server determines that the second opponent is in the event with the first opponent selected by the first user;

automatically alerting the second user to accept the wager offer for the second outcome, based on the first user selecting the wager offer for the first outcome, and wherein the alerting is further based on a preselected event type of the user;

receiving a wager offer acceptance from the second user;

receiving wager funds from the first user and the second user;

determining a winner between the first user and the second user based on an outcome of the event;

automatically alerting the first user and the second user of the outcome of the event via one or more of:

email and text messaging; and disbursing the wager funds to the winner.

10. The method of claim 9, further comprising:

displaying wager statistics for the first user and the second user on a display, wherein the wager statistics are displayed in a hyperlink browser that runs on one of a cellular telephone, a personal digital assistant (PDA), a personal computer (PC), a palm computer, and a notebook computer.

11. The method of claim 9, wherein the second user preselects a wager price range and event type preferences added in a user event preference list for wager offers, and the second user automatically receives an alert for the wager offer when the wager offer is within the pre-selected price range and for event type preferences opposing selected wagers made by other users.

12. The method of claim 9, wherein receiving the wager acceptance from the second user closes the wager from the first user.

13. The method of claim 9, further comprising:

automatically transferring at least a portion of winning funds to participating charities preselected by the first user on a preselected continuing basis.

14. A method comprising:

employing a processor to execute the steps of:

a first user of a plurality of users setting up a limited wagering pool for an event;

determining if a second user of the plurality of users is available to loin the limited wagering pool and automatically alerting the second user to join the limited wagering pool for the event, based on the first user of the plurality of users setting up the limited wagering pool for the event and the remaining wagers available in the limited wagering pool, the second user having previously selected event type, opponent and wager limit preferences, wherein automatically alerting includes sending the second user one or more of: an email and a text message, wherein a preselected opponent of the second user is an opponents in the event;

the second user joining the limited wagering pool through a website receiving wager funds from the second user;

determining at least one winner between the plurality of users based on an outcome of the event;

automatically alerting the plurality of users of the outcome of the event; and disbursing the wager funds to the at least one winner.

15. The method of claim 14, further comprising:

displaying wager statistics for the plurality of users on a display, wherein the wager statistics are displayed in a hyperlink browser that runs on one of a cellular telephone, a personal digital assistant (PDA), a personal computer (PC), a palm computer, and a notebook computer.

16. The method of claim 14, wherein the wager offer is for preselected actual goods or actual services.

17. A non-transitory machine-accessible medium containing instructions that, when executed, cause a machine to:

employ a processor to execute the steps of:

a first user using a website to select a wager offer for a first outcome for an event, wherein the event is between a first opponent and a second opponent, wherein at least the first outcome and a second outcome are possible outcomes for the event, and wherein the first outcome and the second outcome are different outcomes;

a second user of the plurality of users having previously selected second opponent preferences, wherein a server determines that the second opponent is in the event with the first opponent selected by the first user;

automatically alerting the second user to accept the wager offer for the second outcome, based on the first user's selection of the wager offer for the first outcome, and wherein the alerting is further based on a preselected event type of the second users, wherein the alert includes one or more of: an email and a text message;

receiving a wager offer acceptance from the second user automatically alerted to the wager offer of the first user;

receiving wager funds from the first user and the second user;

determining a winner between the first user and the second user based on an outcome of the event;

automatically alerting the first user and the second user of the outcome of the event;

and disbursing the wager funds to the winner.

18. The machine-accessible medium of claim 17, further containing instructions that, when executed, cause the machine to:

display wager statistics for the first user and the second user on a display, wherein the wager statistics are displayed in a hyperlink browser that runs on one of a cellular telephone, a personal digital assistant (PDA), a personal computer (PC), a palm computer, and a notebook computer.

19. The machine-accessible medium of claim 17, wherein the second user pre-selects a wager price range and event type preferences added in a user event preference list for wager offers, and the second user automatically receives an electronic messaging alert for the wager offer when the wager offer is within the pre-selected price range and for at least one of the event type preferences that oppose the event type selected by the first user.

20. The machine-accessible medium of claim 16, wherein the wager offer is for goods or services preselected from participating vendors.

21. A non-transitory machine-accessible medium containing instructions that, when executed, cause a machine to:

employ a processor to execute the steps of:

a first user of a plurality of users setting up a limited wagering pool for an event;

determining if a second user of the plurality of users is available to loin the limited wagering pool and automatically alerting the second user to loin the limited wagering pool for the event, based on the first user setting up the limited wagering pool for the event and the remaining wagers available in the limited wagering pool, the second user having previously selected event type, opponent and wager limit preferences, wherein automatically alerting includes sending the second user one or more of: an email and a text message, wherein a preselected opponent of the second user is an opponent in the event;

the second user joining the limited wagering pool through a website receiving wager funds from the second user;

automatically transferring wager funds from the plurality of users to a neutral account;

determining at least one winner between the plurality of users based on an outcome of the event;

automatically alerting the plurality of users of the outcome of the event;

and disbursing the wager funds to the at least one winner from the account.

22. The machine-accessible medium of claim 21, further containing instructions that, when executed, cause the machine to:

display wager statistics for the plurality of users on a display, wherein the wager statistics are displayed in a hyperlink browser that runs on one of a cellular telephone, a personal digital assistant (PDA), a personal computer (PC), a palm computer, and a notebook computer.

23. The machine-accessible medium of claim 21, wherein the plurality of users are determined to be available for joining in the wagering pool when the wager fund is within a preselected price range and for preselected user specific event preferences.

24. The machine-accessible medium of claim 21, wherein a first company pools funds from the first company participating members and wagers against a second company that pools funds from the second company participating members.

* * * * *